June 24, 1969 K. O. JOHNSON 3,451,654
BLADE VIBRATION DAMPING
Filed Aug. 25, 1967

INVENTOR.
Kenneth O. Johnson
BY
Paul Fitzpatrick
ATTORNEY

United States Patent Office 3,451,654
Patented June 24, 1969

3,451,654
BLADE VIBRATION DAMPING
Kenneth O. Johnson, Cincinnati, Ohio, assignor to General Motors Corporation, Detroit, Mich., a corporation of Delaware
Filed Aug. 25, 1967, Ser. No. 663,371
Int. Cl. F01d 5/14; F04d 29/26
U.S. Cl. 253—77                                    7 Claims

ABSTRACT OF THE DISCLOSURE

A compressor or fan rotor with long blades has means for damping blade vibration comprising a ring with holes through which the blades project at a radius where vibration damping is needed, with a filling of elastomeric material between each blade and the ring. The filling may be self-adhering and cured in place or may be a fabricated body mechanically retained.

---

My invention relates to fans, particularly to such as are used in aircraft propulsion, and more specifically to arrangements for minimizing or damping vibrations of the blades of such fans.

Turbofan engines for aircraft propulsion have proved very successful in recent years and development of larger and more powerful fans is proceeding. These fans may have diameters as great as eight or nine feet and embody blades of considerable span, as much as two or three feet. It is important that the blades be as light as possible, and thus the prevention of destructive vibration or flutter of such blades is a problem. Various lashings and dampings have long been used on long blades in steam turbines, and recently arrangements to prevent or damp vibration have been incorporated in fan rotors. One disclosure of such an arrangement is presented in Johnson U.S. Patent No. 3,396,905. The damping means of the Johnson fan is a frictional damper acting between points roughly at the mid-span of the blades.

According to my invention, vibration of the blades is damped by the provision of a ring having openings through which the blades project, the ring being of such diameter as to lie closely adjacent the blades at an antinodal point where vibration of any sort or flutter, which is a compound of bending and torsional vibration, is pronounced and damping is required.

An elastomeric or rubbery material, which may be any suitable plastic, bridges the gap between the blade and ring and acts by internal absorption of energy, or hysteresis loss, in the viscoelastic material to damp vibrations which might otherwise build up to a destructive level.

The damper according to my invention is extremely simple and easily applied to the fan structure and is advantageous in that the damping is accomplished by hysteresis in the viscoelastic material rather than by parts rubbing together which would cause some wear.

The principal objects of my invention are to improve the performance and durability of high power fans, to provide a simple, reliable, and easily applied damping means to such fans, and to facilitate the incorporation of damping in such fans. The nature of my invention and its advantages will be clear to those skilled in the art from the succeeding detailed description of embodiments of the invention and the accompanying drawings thereof.

Figure 1:
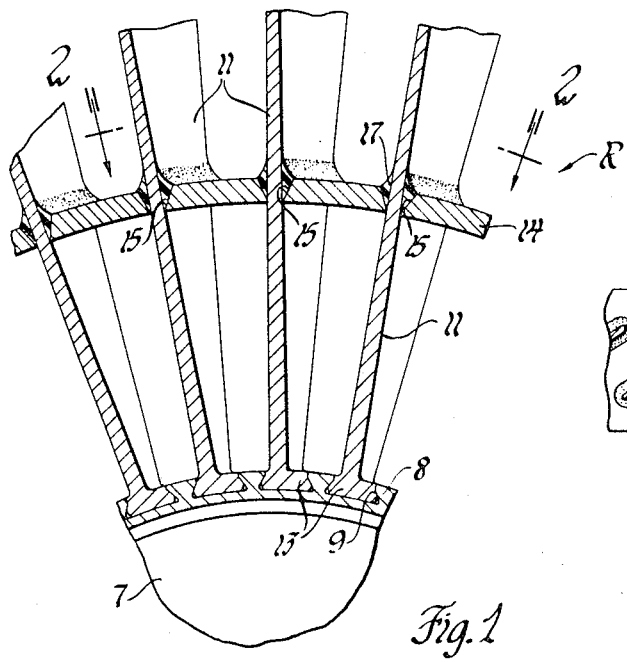
FIGURE 1 is a partial sectional view of a fan taken in a plane perpendicular to the axis of rotation.

Referring to FIGURE 1, a fan rotor R comprises a wheel 7 having a rim 8 with undercut or dovetail slots 9 extending axially of the wheel across the rim. Long fan blades 11 have roots 13 which are engaged in the slots 9. The blades project radially from the wheel in a circumferentially or annular row, only part of which row is illustrated. The wheel, as the term is used herein, may be any suitable annular support such as a drum or disk.

Because of the considerable length and relatively slight thickness of the fan blades and the high velocity of the air relative to the blades, there is a tendency for vibrations to be set up in the blades which may be referred to as blade flutter. Regardless of the specific nature of the vibrations, it is important to prevent their building up to amplitudes which would fatigue the blades. It is difficult to analyze the vibrations but, as a practical matter, it is feasible to test blades to determine the points of maximum vibration or antinodes at which damping would be most effective. When the radius at which the damping is needed is ascertained for a particular design of fan, a damper including a rigid ring 14 coaxial with the wheel may be provided. The ring has a number of openings 15, and one blade projects through each opening with clearance between the blade and the ring. The amount of clearance is subject to design but preferably the openings 15 taper so as to be larger at the outer surface of the ring than at the inner surface.

Figure 2:
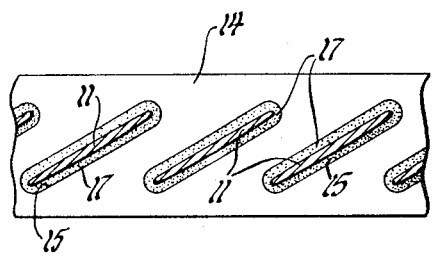
FIGURE 2 is a developed sectional view taken on the plane indicated by the line 2—2 in FIGURE 1.

In the structure of FIGURES 1 and 2, the openings 15 are filled with an elastomeric filling material 17 which adheres to the ring and to the blade. The material 17 constitutes the mounting for the ring 14 and the connection between the ring and the blades which in turn are connected to the wheel. The filling must, of course, be strong and rigid enough to maintain the ring in place, but should be of a slightly yielding nature such that it allows small amplitude vibrations which are damped by hysteresis of the viscoelastic material. The material may, for example, be a room temperature vulcanizing silicone rubber or an epoxy resin with a plasticizer. The filling 17 may be applied with a brush after the blades have been inserted through the ring 14 and the blade roots have been located in the wheel, the ring being maintained concentric with the wheel by any suitable fixture.

Figure 3:
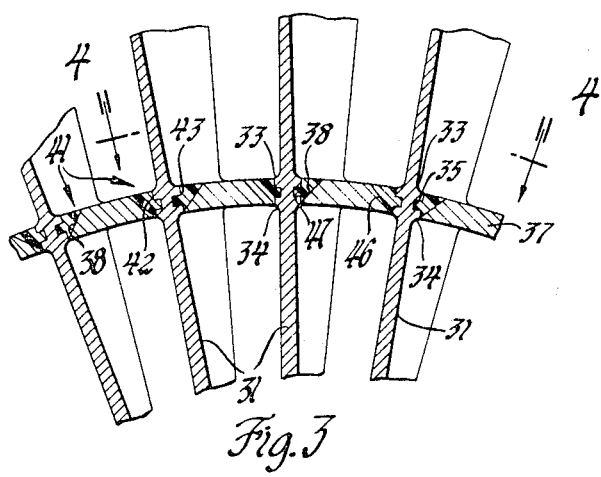
FIGURE 3 is a view similar to FIGURE 1 of a second and preferred embodiment of the invention.
Figure 4:
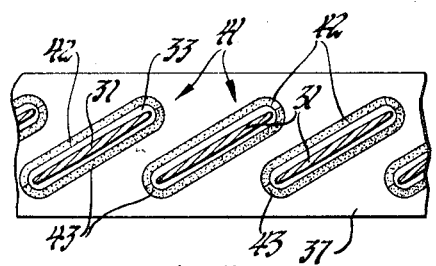
FIGURE 4 is a developed view taken on the plane indicated by the line 4—4 in FIGURE 3.
Figure 5:
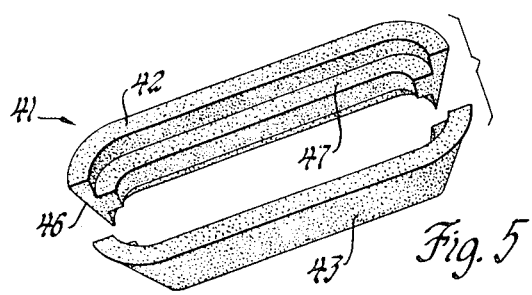
FIGURE 5 is an axonometric view of a filler or damper.

In the preferred form of the invention shown in FIGURES 3, 4, and 5, the filling is provided by preformed bodies which are mechanically interlocked with the ring blades. The structure in FIGURES 3 and 4 differs from that of FIGURES 1 and 2 in that the blades 31 have a radially outer ridge 33 and a radially inner ridge 34 extending around the perimeter of the blade at a desired point in the span of the blade. A groove 35 of rectangular cross section extends around the blade between the two ridges. The radially outer and inner walls of the groove define abutments. Otherwise, the blade may be the same as blade 11. A ring 37 corresponds in location and generally in structure to ring 14. This ring has openings 38 which provide clearance for the blades, including the ridges 34. Preferably, the walls of the openings 38 are cut at approximately a 45° angle to the radial direction.

The filling in this case is provided by a two-part grommet or collar 41 shown most clearly in FIGURE 5. The collar 41 comprises, as illustrated, a section 42 adapted to lie against one face of the blade and a section 43 adapted to lie against the other face, these meeting at the leading and trailing edges of the blade so that the collar can be fitted around the blade between the ridges 33 and 34. Obviously, the joints between the two sections could be at other locations, such as at the mid-chord of the blade, or wherever desired. The collar 41 has a tapered outer wall 46 to conform to the opening 38 and an inner wall adapted to fit against the ridges 33 and 34 and including a rib 47 which projects into and fills the groove 35. The rib 47 defines radially facing shoulders.

To assemble the structure of FIGURES 3 and 4, the blades 31 are extended through the ring 37 with the ridges 34 radially outward of the ring. The two sections of the collar are fitted to each blade and the blade is moved radially inward to seat the collar against the ring 37, in which disposition the blade roots are all slid simultaneously into the wheel. The collars then positively locate ring 37.

While the structure of FIGURES 1 and 2 has the advantage of simplicity, that of FIGURES 3 and 4 is believed to be preferable because of greater ease of installation and greater control of the characteristics of the filling between the blades and rings.

Information on damping and damping properties of materials is available from various sources, including "Shock and Vibration Handbook" edited by Harris and Crede (McGraw-Hill, New York, 1961) pages 36–1 to 36–27.

The description of the preferred embodiment of the invention for the purpose of explaining the principles thereof is not to be considered as limiting or restricting the invention, since many modifications may be made by the exercise of skill in the art.

What is claimed is:

1. A turbomachine rotor comprising, in combination, a wheel, an annular row of blades extending from the wheel, a rigid ring coaxial with and spaced from the wheel disposed adjacent to the blades at an antinodal point in the span of the blades, the ring having an opening for each blade, the blades projecting through the openings with clearance from the ring, and a filling of viscoelastic material having substantial vibration-damping characteristics disposed in each opening, coupling the blade to the ring and locating the ring relative to the wheel, the fillings and blades constituting the entire support of the ring from the wheel.

2. A rotor as recited in claim 1 in which the fillings are self-adhered to the blades and ring.

3. A rotor as recited in claim 1 in which the fillings are mechanically coupled to the blades and ring.

4. A rotor as recited in claim 3 in which the blades include structure defining abutments extending chordwise of the blade and facing radially outward and inward and the filling is a collar defining shoulders facing radially inward and outward engaging the said abutments.

5. A rotor as recited in claim 4 in which the collar is in two sections abutting at a split plane.

6. A rotor as recited in claim 3 in which the blades define a notch extending chordwise and the filling is a collar having a rib entering the notch.

7. A rotor as recited in claim 6 in which the collar is in two sections abutting at a split plane.

References Cited

UNITED STATES PATENTS

| 2,197,335 | 4/1940 | Bohan | 253—77.2 |
| 2,436,087 | 2/1948 | Benson | 253—77.4 |
| 2,595,829 | 5/1952 | Dean | 253—77.4 |
| 2,936,155 | 5/1960 | Howell et al. | |
| 2,771,267 | 11/1956 | Weymouth | 253—77.2 |
| 2,986,375 | 5/1961 | Stalker | 253—77.4 |
| 3,045,964 | 7/1962 | Stalker | 253—77.4 |

HENRY F. RADUAZO, Primary Examiner.

U.S. Cl. X.R.

230—134